Patented Aug. 31, 1948

2,448,154

UNITED STATES PATENT OFFICE 2,448,154

USE OF SYMMETRICAL XENYLTRIAZENES IN MAKING GAS EXPANDED ORGANIC PLASTICS

Henry H. Richmond, Guelph, Ontario, and Markian Tomiuk, Strathmore, Quebec, Canada, assignors to United States Rubber Company, New York, N. Y., a corporation of New Jersey No Drawing. Application October 18, 1947, Serial No. 780,744

16 Claims. (Cl. 260—86.5)

1

This invention relates to gas expanded plastic materials, particularly sponge rubber or closed cell cellular rubber, and the method of making same. The invention relates to new organic chemical blowing agents capable of evolving nitrogen gas upon heating of a mixture of the plastic such as rubber and the blowing agent. In particular the invention relates to new organic chemical blowing agents especially suited for the expansion of rubber and having unusual freedom from discoloring the product, having unusual ability for highly expanding the plastic, imparting unusually good aging properties to the product, being readily stored and handled without decomposition or deterioration and with safety, producing uniform, medium-sized cells throughout the expanded product, having freedom from causing blooming or bleeding of the product and being stable under milling conditions so that they can be readily milled with the plastic especially rubber at the ordinary rubber milling temperatures, and being readily and economically manufactured.

The chemical blowing agents used at the present time for expanding plastics such as rubber have a number of disadvantages. Thus sodium bicarbonate which is widely used at the present time does not always give a uniform cell structure, and the expansion is small compared with the quantity used, it being necessary in some cases to use as much as 25% by weight of the crude rubber. This is partly due to the fact that the decomposition begins to take place at a low temperature as during milling and therefore much of the gas is lost. It is customary to use the sodium bicarbonate in conjunction with a fatty acid like stearic acid. These two react to give off carbon dioxide at any temperature at which they are in contact and therefore there is loss of carbon dioxide before the rubber reaches a temperature where it is sufficiently plastic. The presence of the resulting large quantity of water-soluble filler formed as the decomposition product is not desirable. The storage and use of sodium bicarbonate is greatly affected by moisture conditions, thus producing erratic results. The sponge rubber made with sodium bicarbonate does not age well. Ammonium bicarbonate has been proposed as a blowing agent but it is subject to many of the same objections mentioned with respect to sodium bicarbonate.

It has been proposed to use zinc ammonium nitrite as a non-discoloring blowing agent for rubber but it is unstable and dangerous to handle

2 and store. The use of a mixture of sodium nitrite and ammonium chloride as a blowing agent has also been proposed but is seriously limited by the fact that it is unstable and can be used only when freshly prepared.

It has previously been proposed to use a number of organic chemical compounds as blowing agents for rubber. However none of them is entirely satisfactory. Urea has been used as a low pressure blowing agent but is unsuitable under moisture conditions. It has also been proposed to use 2,5-dimethyl-2,5-dicyano-3,4-diazahexane (also known as $\alpha,\alpha'$-azobisisobutyronitrile) as a blowing agent but it is expensive to prepare, the products formed upon its decomposition are quite toxic, and the expanded rubber made therewith has an unpleasant odor. Diazoaminobenzene has been used as a chemical blowing agent for rubber but it has the disadvantage that it readily causes blooming. In some cases it causes dermatitis on handling. Some of the by-products formed on decomposition during blowing, such as aniline, are toxic. Furthermore use of this blowing agent causes decided discoloring of the product and the aging properties of the expanded product are not very satisfactory. In addition the expanded product prepared therewith stains cloth. Diazoaminobenzene has been found more effective for making closed cell cellular rubber than for sponge rubber and this seriously limits its application.

We have now found that superior results can be obtained by using symmetrical xenyltriazenes as chemical blowing agents for organoplastic materials especially rubber. Symmetrical xenyltriazenes can be used simply by admixing them with the organoplastic material followed by heating to decompose the xenyltriazene with the evolution of nitrogen gas which expands the plastic material. The expanded material is treated either simultaneously or subsequently or both to cause it to permanently retain its expanded structure.

Our invention is especially applicable to the manufacture of chemically blown sponge rubber which has the advantage over sponge made by foaming latex that since it contains other cheap admixed compounding materials it is considerably cheaper than foam sponge which is composed almost entirely of rubber.

The symmetrical xenyl triazenes have the structural formula

R—N=N—NH—R

where the two R's are xenyl groups identically bonded. We prefer to use either 1,3-bis(o-xenyl)-triazene which has the formula

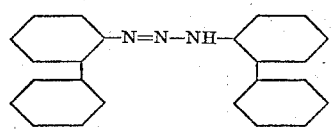

or 1,3-bis(p-xenyl)-triazene which has the formula

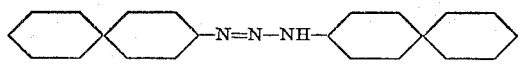

in the practice of our invention. We may employ 1,3-bis(m-xenyl)-triazene but its use is less preferable because m-xenylamine, from which it is most conveniently made, is not available commercially at the present time nor is it easily prepared.

The symmetrical xenyltriazenes may be prepared by methods which are known to those skilled in the art. Methods of making triazenes are discussed in Saunders "The Aromatic Diazo Compounds and Their Technical Application," published by Edward Arnold & Co., London (1936). Thus they may be prepared by the condensation of primary aromatic mono-amines with alkyl nitrites or by the diazotization of the mineral acid salts of the aromatic amines in aqueous solution followed by further condensation with additional amine in neutral or weakly acid media. The latter method is not satisfactory in the case of those amines whose mineral acid salts are but sparingly soluble in water or are hydrolyzed by water. Thus it is not suitable for use with p-xenylamine or o-xenylamine. An especially suitable method of preparation is the condensation of the xenylamine dissolved in a monocyclic aromatic hydrocarbon or halide, such as benzene, toluene or chlorobenzene, as the reaction medium with an alkyl nitrite, especially methyl nitrite, as described in the copending application of Henry H. Richmond, Serial No. 780,745, filed of even date herewith.

We have found that the use of symmetrical xenyltriazenes, especially 1,3-bis(o-xenyl)-triazene and 1,3-bis(p-xenyl)-triazene gives an excellent and unexpected blow in respect to expansion. The expansion is better than one would have expected from these compounds from a consideration of the expansion produced by diazoaminobenzene previously used especially in view of the fact that theoretically diazoaminobenzene gives off more nitrogen than an equal weight of either 1,3-bis(o-xenyl)-triazene or 1,3-bis(p-xenyl)-triazene. The xenyltriazenes are also considerably superior in blow to 1,3-bis(p-tolyl)-triazene.

We have found that the symmetrical xenyltriazenes are especially good blowing agents for GR-S rubber i. e. a rubbery butadiene-styrene copolymer made by the copolymerization of a major proportion of butadiene and a minor proportion of styrene, usually in the neighborhood of 75 parts by weight butadiene and 25 parts styrene, and generally by aqueous emulsion polymerization. This is a novel and unexpected result since the prior art (T. G. Levi, Gomma, vol. 1, pp. 4-5 (1937), also Rubber Chemistry and Technology, vol. 10, pp. 471-73 (1937)) indicated that when triazenes are incorporated in synthetic rubber a non-porous rubber results.

Use of the symmetrical xenyltriazenes such as 1,3-bis(o-xenyl)-triazene and 1,3-bis(p-xenyl)-triazene, in accordance with our invention circumvents the disadvantages of chemical blowing agents used at the present time and gives rise to many advantages among which the following may be enumerated. The expanded rubbers made with the symmetrical xenyltriazenes have good aging characteristics. The symmetrical xenyltriazenes do not cause blooming or bleeding when incorporated in sufficient quantity to give effective blow.

A very important property of 1,3-bis(o-xenyl)-triazene is that little discoloration of the rubber is produced when it is used as the blowing agent and in this respect this xenyltriazene is distinguished from other symmetrical xenyltriazenes. This property appears not to be dependent upon the degree of purification but to be an inherent property of the compound. There is little color introduced aside from the actual color of the 1,3-bis(o-xenyl)-triazene blowing agent itself. Other blowing agents in addition to the discoloration imparted by the intrinsic color of the chemical produce considerable darkening due to chemical reactions and chemical products that are formed. The discoloration is so great in these cases that only very dark colored sponge rubber can be made. In the case of 1,3-bis(o-xenyl)-triazene the discoloration is only slight and consequently other dyes can be added to produce sponge rubber of a wide variety of colors and tints including light shades. For these reasons 1,3-bis(o-xenyl)-triazene lends itself particularly well to the manufacture of colored expanded rubber such as colored sponge rubber.

Medium-sized pores obtained by the use of 1,3-bis(o-xenyl)-triazene and 1,3-bis(p-xenyl)-triazene as the blowing agent were considerably superior in uniformity to those usually produced in the decomposition of sodium bicarbonate. The pores were larger and better defined than those obtained from 2,5-dimethyl-2,5-dicyano-3,4-diaza-hexane in the same GR-S compound.

A skin-test made with 1,3-bis(o-xenyl)-triazene by application to the delicate skin of the under-forearm for three days showed no effect at all in the one individual tested indicating that dermatitis had not resulted.

The decomposition temperatures of the blowing agents of the present invention are within the range commonly used for the manufacture of expanded rubber, namely 120°–140° C. It has been found by actual tests on rubber stocks containing same that 1,3-bis(o-xenyl)-triazene causes gassing at 130–135° C. while, 1,3-bis(p-xenyl)-triazene causes gassing at 120° C. By choosing the proper symmetrical xenyltriazene a blowing agent with a decomposition temperature needed for any special purpose may be employed.

We have found that the exothermic heat released by decomposition of 1,3-bis(o-xenyl)-triazene and 1,3-bis(p-xenyl)-triazene is negligible. This has the advantage that there is not any uncontrollable scorching.

Since the gas released on decomposition of the symmetrical xenyltriazenes is mostly nitrogen with small quantities of ammonia, there is no danger of ill effects from the formation of toxic gases. The symmetrical zenyltriazenes were found to be stable under milling temperatures, thus permitting the incorporation thereof in the rubber mix on the rubber mill in the ordinary way. The symmetrical xenyltriazenes are versatile blowing agents since they can be used with any type of expansible curable rubber such as GR-S, natural rubber, and neoprene to give satisfactory expanded rubbers which may be of either the sponge or the closed cell type and which may range from soft to hard rubber after curing. A most important property of stock blown with 1,3-bis(o-xenyl)-triazene is that a product free from any tendency to stain cloth is easily prepared therewith.

Because the products resulting from decomposition of the symmetrical xenyltriazenes are of higher molecular weight and hence of low solubility, the blown product upon handling gives less toxic by-products than does a product blown with diazoaminobenzene. Because of the accelerating action of some of the products of decomposition such as ammonia, upon the vulcanization of the rubber, the quantity of accelerators that need be added to the rubber mix may be reduced with corresponding decrease in cost. This accelerating action takes place within the rubber where externally applied heat is not as effective as on the surface of the curing rubber. Furthermore, the decomposition of the symmetrical xenyltriazenes also forms substituted amines which impart an antioxidant action which diminishes the quantity of antioxidant added in the compounding of the rubber mix with corresponding decrease in cost. In addition the decomposition products of the symmetrical xenyltriazenes have a plasticizing effect on rubber which reduces the quantity of plasticizer needed in the compounding of the rubber stock to be expanded.

In the case of 1,3-bis(o-xenyl)-triazene, 67.4 cc. of nitrogen (measured at 760 mm. and 25° C.) are liberated for each gram of the compound decomposed. The residual decomposition products from the symmetrical xenyltriazenes are believed to include various aromatic amines, diphenyl, indulines, resinamines and neutral tar.

The symmetrical xenyltriazenes may readily be prepared in fine particle size without grinding and since they are practically insoluble in rubber, the uniformity and size of the pores may be regulated by the extent of dispersion of the compounds through the rubber. They have a higher decomposition temperature than other commonly used chemical blowing agents and therefore are suitable for use with plastics having high softening points. The higher temperature of decomposition also assists in producing a greater blow since the pressure of the generated nitrogen is higher at the higher temperature and hence can overcome greater resistance of the rubber or other plastic.

When employing symmetrical xenyltriazenes in expanding rubber in accordance with our invention. it is important to exclude air during the heating in order to avoid formation of a sticky product. This is readily accomplished by the use of the ordinary molds. If desired. the mix may be surrounded by an inert (oxygen-free) gas during the heating step or steps.

The symmetrical xenyltriazenes can be handled at ordinary temperature without danger of decomposition and are stable at moderately elevated temperature (which enables them to be milled into the rubber or other plastic at the usual milling temperatures which generally do not exceed 80° C.) but decompose at the vulcanization temperature (usually of the order of 115–140° C.) with the evolution of nitrogen as explained above.

The method of the present invention can be employed to expand any organoplastic material which is capable of setting to a normally solid state and having sufficient consistency and tensile strength under the conditions prevailing during the expansion step to retain the evolved expanding gas and the resulting expanded structure. For example if a closed cell type of product is being made, the organoplastic should have enough consistency during the application of heat for the purpose of evolving the expanding gas to retain the evolved gas and prevent it from rupturing the organoplastic, whereby the closed cell structure is maintained. In the manufacture of a sponge type of product, on the other hand, the organoplastic should have such a consistency and strength that it allows the gas bubbles to rupture and interconnect but retains the resulting sponge structure.

Examples of organoplastic materials which may be expanded in accordance with our invention are resins such as alkyd resins, urea-formaldehyde resins, polymerized unsaturated materials such as polyacrylonitrile, polystyrene, polyvinyl chloride, copolymers of vinyl chloride and vinyl acetate, amorphous non-resinous plastic materials such as cellulose esters for example cellulose acetate, cellulose ethers such as ethyl cellulose, etc. The organoplastic may be of either the thermoplastic or the thermosetting type and it may be of a type of which polymerization is furthered or completed during the step of heating to generate the gas.

The blowing agents of our invention may also be employed very advantageously to produce a cured hard, boardy cellular thermoplastic homogeneous mixture of a sulfur-vulcanizable elastic rubber, especially GR-S, and a hard normally inelastic resinous copolymer of styrene and butadiene-1,3 in the proportion of from 80 to 97 per cent styrene and correspondingly from 20 to 3 per cent of butadiene, the resinous copolymer being present in an amount ranging from 50 to 90% of the sum of the weights of the rubbery component and the resinous copolymer. In this way an expanded board having a density as low as 3 to 4 pounds per cubic foot may be made using only 15 parts of the xenyltriazene per 100 parts of rubber and resin.

The invention is especially applicable to the expansion of rubber. Any type of rubber which is curable or vulcanizable to a solid state may be employed, examples being natural rubber or synthetic rubber-like or rubbery materials such as rubbery copolymers of an aliphatic conjugated diolefin such as butadiene or isoprene with a copolymerizable material such as styrene or acrylonitrile rubbery copolymers of olefins and diolefins such as that known in the art as "butyl" rubber which is the copolymer of isobutylene with a small proportion of an aliphatic conjugated diolefin such as butadiene or isoprene, polymerized halo-diolefins such as polymerized 2-chloro-1,3-butadiene, polymerized olefins such as polyisobutylene, polymeric organic sulfides such as olefin polysulfide, etc.

With the rubber is incorporated the usual compounding ingredients including curing or vulcanizing agents such as sulfur, accelerators, activators, anti-oxidants, plasticizers, softeners, pigments, fillers, dyestuffs, etc. If desired reclaimed rubber may be incorporated in the mix. The rubber may be first broken down on the mill whereupon the blowing agent may be added followed by other ingredients, curatives usually being added last. After compounding we prefer to allow the stock to stand for a day or more before carrying out the blowing and curing step or steps.

The manipulative methods of treating the compounded stock to obtain the expanded product are those which are well-known and standard in the art. For details of the art of making chemically gas expanded plastics such as rubber attention may be directed to the article "Cellular rubbers" by Gould appearing in Rubber Chemistry and Technology, vol. 17, pp. 943–956 (October, 1944) and U. S. patents to Cuthbertson 2,291,213 and to Roberts et al. 2,299,593. It is well within the present skill of the art in the light of this disclosure to compound a stock containing our blowing agent and process it so as to obtain either a sponge or a closed cell type of product.

Our invention is particularly useful in making sponge rubber, by which is meant an expanded rubber with interconnecting cells and channels so that it has a "breathing" structure. The invention is especially advantageous for making sponge GR-S which may range from soft to hard. As an example of hard GR-S sponge rubber, we may employ 1,3-bis(o-xenyl)-triazene with hard GR-S stock in the proportion of 15 parts of the triazene to 100 parts of said stock. Upon blowing and curing there is obtained a very satisfactory hard sponge.

For GR-S sponge of customary softness, we generally use much less of the xenyltriazene than the 15 parts just mentioned for hard GR-S sponge, namely from 2 to 3 parts xenyltriazene per 100 parts of the rubbery butadiene-styrene copolymer.

The degree of resilience of the GR-S sponge made by blowing with symmetrical xenyltriazenes in accordance with our invention is good but can be improved by the addition of crude (natural) rubber to the GR-S stock. The use of up to 15% of such crude rubber, say from 5 to 15 parts per 100 parts of rubbery butadiene-styrene copolymer, is found to be very advantageous in preparing GR-S sponge rubber inasmuch as it yields a smoother, softer material with better resilience.

In accordance with standard technique for making sponge rubber by chemical blowing, in making GR-S sponge we heat the mix containing the GR-S and the usual compounding and vulcanizing agents together with the symmetrical xenyltriazene blowing agent to substantially simultaneously decompose the xenyltriazene with the expansion of the mix to a spongy structure and vulcanize the mix.

By suitably modifying the manufacturing procedure, the symmetrical xenyltriazenes may be used to form cellular rubber by which is meant an expanded rubber filled with gas cells which are not interconnected. In manufacturing closed cell expanded rubber using the symmetrical xenyltriazenes, the compounded rubber may first be partially cured at a temperature below the decomposition temperature of the triazene in order to increase its consistency and tensile strength sufficiently that when subsequently heated to the decomposition temperature of the xenyltriazene there is no rupturing and interconnecting of the cells. The expansion may be allowed to take place during the decomposition step or thereafter. The expanded material is cured to complete the vulcanization.

The amount of the symmetrical xenyltriazene employed in practicing our invention may vary widely depending upon many factors including the particular xenyltriazene employed, the type of product desired, the degree of expansion desired, etc. Usually it will not be less than 2 nor more than 15 parts per 100 parts of rubber or other organoplastic. For a closed cell product it will usually be not less than 2 nor more than 3 parts per 100 parts of organoplastic. For ordinary sponge, similar limits will ordinarily apply. For hard GR-S sponge, as much as 15 parts per 100 parts of GR-S crude may be used.

Other blowing agents may be used in conjunction with the symmetrical xenyltriazenes of our invention. For example in making soft sponge GR-S, we have found it to be very advantageous to use from 7 to 10 parts of sodium bicarbonate together with from 2 to 3 parts of the xenyltriazene per 100 parts of crude GR-S.

RUBBER TESTS

Throughout these tests, the following procedure was employed:

For black GR-S sponge, the stock used was the regular GR-S thrice plasticated; for colored GR-S compounds the stock used was GR-S-50 (which is a 76.5% butadiene-23.5% styrene copolymer rubber made to a Mooney viscosity of 50 and having a non-discoloring anti-oxidant incorporated therein) passed through a strainer. In mixing, the GR-S polymers were broken down on a cold, tight mill to form a smooth band; the blowing agents were added next followed by the other ingredients; curatives were added last. After compounding, the stocks were allowed to stand at least 24 hours before sheeting out for curing. The stocks were press-cured in frames 8" x 8" x 1" and 8" x 8" x 1.5". A piece of lightly soapstoned duck was placed on the top and bottom of each shaped specimen to insure proper blowing. All samples were cured under similar conditions. The sample specimens were measured cold for shrinkages. The optimum blow was determined by measuring volume expansion of sample specimens containing various quantities of the blowing agent.

GR-S Sponge Made With 1,3-bis (o-Xenyl)-Triazene 1,3-bis(o-xenyl)-triazene, prepared by passing freshly generated methyl nitrite vapor into a solution of o-xenylamine in toluene in accordance with co-pending application Serial No. 780,745 mentioned above, was found to perform equally well in black and colored GR-S stocks. Because of its light color and freedom from discoloration it was especially suitable for light-colored GR-S sponge. However, due to its yellow color, it was not so suitable for white sponge. The blow obtained from samples curved in the laboratory was in the ratio of 5 to 1 for 1" thick sponge and 6 to 1 for 1.5" thick sponge, and in all cases a uniform medium-sized cell structure was obtained. The density of the sponge ranged from 12 to 15 pounds per cubic foot which was considerably less than that obtained from sodium bicarbonate or other commonly used blowing agents.

Moreover, 1,3-bis(o-xenyl)-triazene was found to have a definite effect on the rate of curing. This was observed from samples which cured satisfactorily even though they contained only 1,3-bis(o-xenyl)-triazene-sulfur combination. The accelerating action was apparently derived from the residue left by the gassing reaction. Although use of 1,3-bis(o-xenyl)-triazene-sulfur combination resulted in a fairly tight cure, the addition of a small amount of a thiazole or thiuram accelerator had a pronounced effect on the resilience, the texture of cell structure and the discoloration of the sponge. The use of 0.50 part of phenylaminomethyl benzothiazole sulfide and 3.00 parts of 1,3-bis(o-xenyl)-triazene per 100 parts of GR-S resulted in uniform, medium sized cell structure, very good blow, and very little discoloration due to light. The use of a combination of tetramethyl thiuram monosulfide and phenylaminomethyl benzothiazole sulfide with the 1,3-bis(o-xenyl)-triazene gave large cells in the center and very small cells next to the skin, indicating fast cure. Acceleration with the condensation product of aniline and butyraldehyde gave an excellent blow, small uniform cells and low resilience. All experimental samples exhibited good natural skin due to the accelerating action of the 1,3-bis(o-xenyl)-triazene.

From numerous experimental trials, it was determined that the use of from 2.5 to 3.00 parts of 1,3-bis(o-xenyl)-triazene per 100 parts of GR-S was sufficient for the optimum blow. The use of 1,3-bis(o-xenyl)-triazene in excess of 3.00 parts per 100 parts of GR-S was observed to result in low resilience due to the plasticizing action of the residue obtained by the decomposition reaction.

The use of 2.00 parts of 1,3-bis(o-xenyl)-triazene in combination with from 7 to 10 parts of sodium bicarbonate per 100 parts of GR-S was found to produce excellent results. The carbon dioxide which is evolved is soluble in the rubber and helps the nitrogen to spread through the rubber. The carbon dioxide finally diffuses out into the air since the carbon dioxide concentration in the air is low. The evolution of carbon dioxide also increases the gas pressure thus increasing the expansion temporarily i. e. until the carbon dioxide diffuses out. No increase in over-all blow was noted due to the addition of sodium bicarbonate, but the improvement in resilience and the decrease in discoloration were quite remarkable.

The blowing properties and acceleration effect on GR-S of 1,3-bis(o-xenyl)-triazene prepared by the condensation of amyl nitrite with o-xenylamine as described in the above-identified application was found to be very similar to that prepared by the methyl nitrite process except that the discoloration of the sponge due to light was more pronounced and the odor was more objectionable.

1,3-BIS(P-XENYL)-TRIAZENE AS BLOWING AGENT FOR GR-S SPONGE 1,3-bis(p-xenyl)-triazene as a blowing agent for GR-S sponge was found to closely resemble 1,3-bis(o-xenyl)-triazene in its behavior and performance. The ratio of blow, the texture of cell structure, the effect on cure and the plasticizing action of the residue left by the decomposition reaction were observed to be similar to those obtained with 1,3-bis(o-xenyl)-triazene. 1,3-bis(p-xenyl)-triazene discolored white sponge compound to a lemon-yellow color which turned reddish-brown after cure.

A comparison of the behavior of 1,3-bis(o-xenyl)-triazene and 1,3-bis(p-xenyl)-triazene for making GR-S sponge with that of sodium bicarbonate is best illustrated by the following data.

The basic compound used in the formulations was as follows:

| Ingredient | Parts by Weight |
|---|---|
| GR-S i. e. Butadiene 75/styrene 25 copolymer | 100.00 |
| Zinc oxide | 30.00 |
| Hydrated amorphous silica | 35.0 |
| Whiting | 50.0 |
| Paraffin wax | 2.0 |
| Di(beta-naphthyl)-p-phenylenediamine | 1.50 |
| Phenylaminomethyl benzothiazole sulfide | 0.50 |
| Sulfur | 5.00 |
| Mineral Oil | 60.0 |
| | 284.00 |

*Properties of cured sponge samples—8" x 8" x 1"*

| | A | B | C | D |
|---|---|---|---|---|
| Above master batch | 284.0 | 284.0 | 284.0 | 284.0 |
| 1,3-bis(o-xenyl)-triazene | 3.0 | | 3.0 | |
| 1,3-bis(p-xenyl)-triazene | | 3.0 | | |
| Sodium bicarbonate: Cure 30 minutes at 307° F | | | 10.0 | 20.0 |
| Relative cure | Light | Light | Light | Light. |
| Color of cured samples | Buff | Lt. brown | Lt. buff | Natural. |
| Blow texture | medium uniform | medium uniform | medium uniform | coarse. |
| Resilience | good | good | good | good. |
| Shrinkage | slight | slight | slight | slight. |
| Density, Lbs./cu. ft | 13.7 | 13.3 | 12.9 | 19.4. |
| Discoloration to light | slight (lt. brown) | brown | slight | slight. |
| Staining to cloth | none | v. slight | none | none. |
| Blooming | do | none | do | Do. |

HARD CELLULAR PLASTIC BOARD MADE WITH 1,3-BIS(O-XENYL)-TRIAZENE

Hard expanded plastic board was made by the employment of 15 parts of 1,3-bis(o-xenyl)-triazene with the following composition:

*Table*

| Ingredient | Parts by Weight |
|---|---|
| GR-S | 30 |
| Hard Inelastic Resinous Copolymer of 15% butadiene and 85% styrene (140° F. softening point) | 70 |
| Zinc Oxide | 2 |
| Sulfur | 2 |
| Accelerator | 0.5 |
| Anti-oxidant | 1 |
| | 105.5 |

The butadiene-styrene resinous copolymer was banded on the mill at 240–260° F. and the GR-S added milling being continued until the mixture was homogeneous. The zinc oxide, accelerator and anti-oxidant were then milled into the batch. The mixture was cooled to 150° F. and the blowing agent added. The sulfur or other suitable curing agent was incorporated after the blowing agent had been intimately incorporated. The composition was then calendered into sheets of the desired thickness. The sheet material was cured in a mold under pressure for twenty minutes at 212° F. The pre-molded sheet material was then further cured in an oven for thirty minutes at 280° F., the material being unconfined so that it was free to expand. The expanded material was then allowed to cool. The density of the expanded plastic board was in the neighborhood of three to four pounds per cubic foot.

The resultant product is stiff and durable yet not at all brittle. It has a closed-cell structure. A corresponding product made in the same way but with 15 parts of diazoaminobenzene instead of the 15 parts of 1,3-bis(o-xenyl)-triazene had a density of about 8 pounds per cubic foot.

Having thus described our invention, what we claim and desire to protect by Letters Patent is:

1. The method of making a gas expanded organoplastic material which comprises mixing a symmetrical xenyltriazene with an organoplastic material which is capable of setting to a normally solid state and having sufficient consistency and tensile strength at temperatures of from 120° to 140° C. to retain the expanded structure resulting from the subsequent heating step and decomposing said triazene by heat to evolve nitrogen and expand said organoplastic material.

2. The method of making a gas expanded rubber which comprises mixing a symmetrical xenyltriazene with rubber, decomposing said triazene by heat to evolve nitrogen and expand said rubber, and curing the rubber to cause it to retain its expanded condition.

3. The method of making a gas expanded organoplastic material which comprises mixing 1,3-bis(o-xenyl)-triazene with an organoplastic material which is capable of setting to a normally solid state and having sufficient consistency and tensile strength at temperatures of from 120° to 140° C. to retain the expanded structure resulting from the subsequent heating step, decomposing said triazene by heat to evolve nitrogen and expand said organoplastic material, and causing said organoplastic material to set and retain its expanded condition.

4. The method of making a gas expanded rubber which comprises mixing 1,3-bis(o-xenyl)-triazene with rubber, decomposing said triazene by heat to evolve nitrogen and expand said rubber, and curing the rubber to cause it to retain its expanded condition.

5. The method of making a gas expanded rubber which comprises mixing 1,3-bis(p-xenyl)-triazene with rubber, decomposing said triazene by heat to evolve nitrogen and expand said rubber, and curing the rubber to cause it to retain its expanded condition.

6. The method of making a gas expanded rubbery butadiene-styrene copolymer which comprises mixing a symmetrical xenyltriazene with a rubbery butadiene-styrene copolymer, decomposing said triazene by heat to evolve nitrogen and expand said copolymer, and curing the copolymer to cause it to retain its expanded condition.

7. The method of making a rubbery butadiene-styrene copolymer sponge which comprises mixing a symmetrical xenyltriazene with a rubbery butadiene-styrene copolymer, incorporating in the mix compounding and vulcanizing agents, and heating the mix to a temperature sufficiently elevated to substantially simultaneously decompose said triazene with the evolution of nitrogen which expands said mix to a spongy condition and vulcanize the mix.

8. The method of making a rubbery butadiene-styrene copolymer sponge which comprising mixing with a rubbery butadiene-styrene copolymer from 2 to 3 parts by weight of 1,3-bis(o-xenyl)-triazene per 100 parts of said copolymer, incorporating in the mix compounding and vulcanizing agents, and heating the mix to a temperature sufficiently elevated to substantially simultaneously decompose said triazene with the evolution of nitrogen which expands said mix to a spongy condition and vulcanize the mix.

9. The method of making a rubbery butadiene-styrene copolymer sponge which comprises mixing with a rubbery butadiene-styrene copolymer from 2 to 3 parts by weight of 1,3-bis(o-xenyl)-triazene and from 7 to 10 parts by weight of sodium bicarbonate per 100 parts of said copolymer, incorporating in the mix compounding and vulcanizing agents, and heating the mix to a temperature sufficiently elevated to substantially simultaneously decompose said triazene and sodium bicarbonate with the liberation of nitrogen and carbon dioxide which expands said mix to a spongy condition and vulcanize the mix.

10. The method of making colored sponge rubber which comprises admixing 1,3-bis(o-xenyl)-triazene and sodium bicarbonate and coloring material with rubber and decomposing said triazene and sodium bicarbonate by heating to evolve gases and expand said rubber, said decomposition being conducted under such conditions that the gas bubbles formed rupture and communicate with one another to give a sponge structure.

11. The method of claim 7 wherein the mix contains from 5 to 15 parts by weight of crude natural rubber per 100 parts of said copolymer.

12. The method of making hard cellular expanded plastic board which comprises adding a symmetrical xenyl-triazene to a mixture of a sulfur-vulcanizable elastic rubber and a hard normally inelastic resinous copolymer of styrene and butadiene, incorporating in the mixture compounding and vulcanizing agents, and heating the mixture to decompose said triazene and expand said mixture by the evolution of nitrogen and vulcanize the expanded mixture.

13. The method of making closed cell expanded rubber which comprises admixing a symmetrical xenyl-triazene with a vulcanizable rubber mix comprising a sulfur-vulcanizable elastic rubber and a vulcanizing agent, partially curing the resulting mixture at a temperature below the decomposition temperature of said triazene to increase its consistency and tensile strength to such an extent that the gas cells will not rupture and interconnect during the subsequent gas generating step, heating the resulting partially cured mixture to a temperature at which said triazene decomposes and forms bubbles of nitrogen gas, allowing the mixture to expand under the influence of said bubbles of nitrogen gas, and completing vulcanization of the material.

14. A composition of matter capable of yielding a gas expanded material upon heating, said composition comprising an organoplastic material capable of setting to a normally solid state and having sufficient consistency at temperatures of from 120° to 140° C. to retain a gas evolved therein and the resulting gas expanded structure and a symmetrical xenyltriazene as a blowing agent therefor.

15. A composition of matter capable of yielding a gas expanded rubber, said composition comprising a curable rubber mix comprising a curable elastic rubber and a curing agent therefor, said mix containing a symmetrical xenyltriazene as a blowing agent therefor.

16. In a method of making a gas expanded organoplastic material wherein a chemical blowing agent is mixed with an organoplastic material and the resulting mixture is heated to a temperature at which said chemical blowing agent decomposes with the evolution of a gas which expands said organoplastic material, said organoplastic material being capable of setting to a normally solid state and having sufficient consistency and tensile strength at the decomposition temperature of the blowing agent to retain the resulting expanded structure, the improvement which comprises employing as the blowing agent a symmetrical xenyltriazene in an amount ranging from 2 to 15 parts per 100 parts of said organoplastic material.

HENRY H. RICHMOND.
MARKIAN TOMIUK.

REFERENCES CITED

The following references are of record in the file of this patent:

UNITED STATES PATENTS

| Number | Name | Date |
|---|---|---|
| 2,299,593 | Roberts et al. | Oct. 20, 1942 |
| 2,335,730 | Blake | Nov. 30, 1943 |